(12) United States Patent
van Cruyningen (10) Patent No.: US 10,580,310 B2
(45) Date of Patent: Mar. 3, 2020

(54) UAV ROUTING IN UTILITY RIGHTS OF WAY

(71) Applicant: Izak Jan van Cruyningen, Saratoga, CA (US)

(72) Inventor: Izak Jan van Cruyningen, Saratoga, CA (US)

( * ) Notice: Subject to any disclaimer, the term of this patent is extended or adjusted under 35 U.S.C. 154(b) by 159 days.

(21) Appl. No.: 15/647,242

(22) Filed: Jul. 11, 2017

(65) Prior Publication Data

US 2018/0012504 A1 Jan. 11, 2018

Related U.S. Application Data

(60) Provisional application No. 62/360,954, filed on Jul. 11, 2016.

(51) Int. Cl.
*G08G 5/00* (2006.01)
*G05D 1/10* (2006.01)
*B64C 39/02* (2006.01)
*H02J 7/02* (2016.01)
*G05D 1/04* (2006.01)
*G06Q 50/28* (2012.01)

(52) U.S. Cl.
CPC ........... *G08G 5/0069* (2013.01); *B64C 39/02* (2013.01); *B64C 39/024* (2013.01); *G05D 1/042* (2013.01); *G05D 1/101* (2013.01); *G05D 1/104* (2013.01); *G06Q 50/28* (2013.01); *G08G 5/003* (2013.01); *G08G 5/006* (2013.01); *G08G 5/0021* (2013.01); *G08G 5/0034* (2013.01); *G08G 5/0052* (2013.01); *H02J 7/025* (2013.01); *B64C 2201/12* (2013.01); *B64C 2201/141* (2013.01); *B64C 2201/146* (2013.01)

(58) Field of Classification Search
USPC .......................................................... 701/4
See application file for complete search history.

(56) References Cited

U.S. PATENT DOCUMENTS

| 9,087,451 | B1 | 7/2015 | Jarrell | |
|---|---|---|---|---|
| 9,359,074 | B2 | 6/2016 | Ganesh | |
| 9,494,937 | B2 | 11/2016 | Siegel | |
| 9,513,635 | B1* | 12/2016 | Bethke | G01C 21/20 |
| 2015/0353196 | A1* | 12/2015 | van Cruyningen | B64C 39/024 701/2 |
| 2016/0117933 | A1* | 4/2016 | Chan | G08G 5/0069 705/317 |
| 2016/0216304 | A1 | 7/2016 | Sekelsky | |
| 2017/0192418 | A1* | 7/2017 | Bethke | G05D 1/0094 |
| 2017/0336806 | A1* | 11/2017 | Blanc-Paques | G08G 5/045 |
| 2017/0358228 | A1* | 12/2017 | Priest | G08G 5/045 |
| 2018/0002010 | A1* | 1/2018 | Bauer | B64C 29/0025 |
| 2018/0012504 | A1* | 1/2018 | van Cruyningen | G08G 5/0069 |
| 2018/0062994 | A1* | 3/2018 | Webb | H04W 4/021 |
| 2018/0246528 | A1* | 8/2018 | van Cruyningen | B64C 39/024 |
| 2019/0019418 | A1* | 1/2019 | Tantardini | B64C 39/024 |
| 2019/0043368 | A1* | 2/2019 | Priest | B64C 39/024 |

* cited by examiner

Primary Examiner — Tyler D Paige (57) ABSTRACT

Using power line rights of way for UAV routing provides a direct, uninterrupted, aerially clear path to the vast majority of lots and buildings from nearby substations and generating stations. Segmenting or separating the UAV traffic by airframe glide ratio improves safety for people on the ground and utilization of the limited airspace. Further segmenting UAV traffic by airframe speed and size allows greater traffic throughput.

22 Claims, 5 Drawing Sheets

UAV ROUTING IN UTILITY RIGHTS OF WAY

CROSS-REFERENCE TO RELATED APPLICATIONS

This application claims the benefit of provisional patent application Ser. No. 62/360,954 filed 2016 Jul. 11 by the present inventor.

BACKGROUND

Prior Art

Electric power transmission and distribution primarily uses overhead lines. The power utility company has an easement on a right of way (ROW) around the overhead line. For high voltage transmission lines the ROW may be two hundred feet wide; whereas for a neighborhood distribution line the ROW may be thirty feet wide; and for distribution along the back or sides of a lot the ROW may be five feet wide. Within the ROW the utility company manages vegetation and construction to maintain clearances to the lines. Incursions into the ROW are regularly checked and corrected to make sure there are no foreign objects near the power lines. In scenic, congested, or wealthy areas power lines may be buried, but undergrounding costs 4-14 times more than overhead lines. Currently 97% or more of power lines are above ground in the United States, and they connect the vast majority of houses.

Delivering parcels and material by drone or unmanned aerial vehicles (UAV) is desirable since deliveries can be faster, cheaper, and more efficient. One challenge to widespread adoption of UAV delivery is routing to meet safety objectives and to avoid collisions between autonomous drones. In manned flight the available airspace is divided into layers with certain altitudes reserved for certain directions of flight. The layers are separated by about one thousand feet vertically and flights are tracked by air traffic control to ensure sufficient separation. However, the total available altitude under Federal Aviation Administration (FAA) small unmanned aerial system (sUAS) rules for UAVs is four hundred feet. This makes it difficult to keep enough space between drones in a layered system.

Prior art reference US20160216304A1 discloses using the distinct magnetic signature of power lines for navigation of UAVs using power lines as roads and highways [0026]. It does not discuss airspace segmentation and regulation of UAV traffic.

Prior art references U.S. Pat. No. 9,087,451, U.S. Pat. No. 9,359,074B2, and U.S. Pat. No. 9,494,937B2 disclose UAV routing over roadways and mention power lines only as obstacles. Roadways are crossed by bridges, trees, stoplights, power lines, and other obstructions to flight. The FAA also explicitly disallows flights over people not involved with the operation, so it would be more risky and currently not legal to fly over roadways with cars and pedestrians.

High speed highways with multiple lanes in each direction use different lanes for different speeds; segmenting traffic by speed to maximize throughput and minimize traffic conflicts.

SUMMARY

Using power line rights of way for UAV routing provides a direct, uninterrupted, aerially clear path to the vast majority of lots and buildings from nearby substations and generating stations. Segmenting or separating the UAV traffic by airframe glide ratio improves safety for people on the ground and utilization of the limited airspace. Further segmenting UAV traffic by airframe speed and size allows greater traffic throughput.

Advantages

Utilities have had rights of way for overhead lines for more than a century. UAV routing and delivery is relatively new. Routing UAVs along utility rights of way is a novel and non-obvious approach to improving safety, enhancing efficiency, and improving utilization of an existing resource. Various aspects of the embodiments of my UAV routing method are superior because:

Power line rights of way extend uninterrupted from generating stations to substations to each individual lot.

Power line companies currently have the right and obligation to maintain clearances above and around the power lines, so that airspace is free from obstructions to flight.

Larger power lines are generally located in remoter, quieter areas, away from people; and residential lines are often located at the back or sides of lots, away from most activity.

Additional unanticipated advantages include:

The power lines provide a ready source of energy for recharging the UAV to extend its range. The UAV could either perch on the lines or dock at charging stations built on transformers mounted on the towers and poles.

The additional 400 feet of airspace allowed by the FAA adjacent to and above the power line structures provides a corridor free of manned airframes, eases congestion, and increases the altitude safety margin for the UAV.

Flying in linear directions beside and above the lines substantially reduces the number of angles a UAV has to check to sense and avoid other UAVs and obstructions. Instead of checking the full four Pi steradians all the time, it can focus on a cone in the forward direction most of the time, with sideways checks at branches or turn-offs.

Platforms built on towers can be used to transfer loads from large, long distance UAVs to smaller, more maneuverable local delivery UAVs.

The alternating 50/60 Hz field strength can be used as a hardware geofence failsafe shaped like a UAV Tunnel in case the UAV primary navigation fails or is jammed.

The alternating 50/60 Hz field strength and direction can be used for supplementary navigation input.

The known configuration and spacing of the conductors can be used with a camera to determine distance and angle from the lines to the UAV as another navigation input.

Power line companies already use avian repellents to keep birds away, so routing the UAVs along the lines is less likely to disturb or cause conflicts and collisions with birds.

Power meters can provide a landing spot, homing signal, and charging station for the UAV, as well as communicating with occupants that a delivery has arrived. Smart meters already have wireless technology installed.

Other advantages of one or more aspects will be apparent from a consideration of the drawings and ensuing description.

DETAILED DESCRIPTION

This section describes several embodiments of the UAV routing method with reference to FIGS. 1-8.

Figure 1:
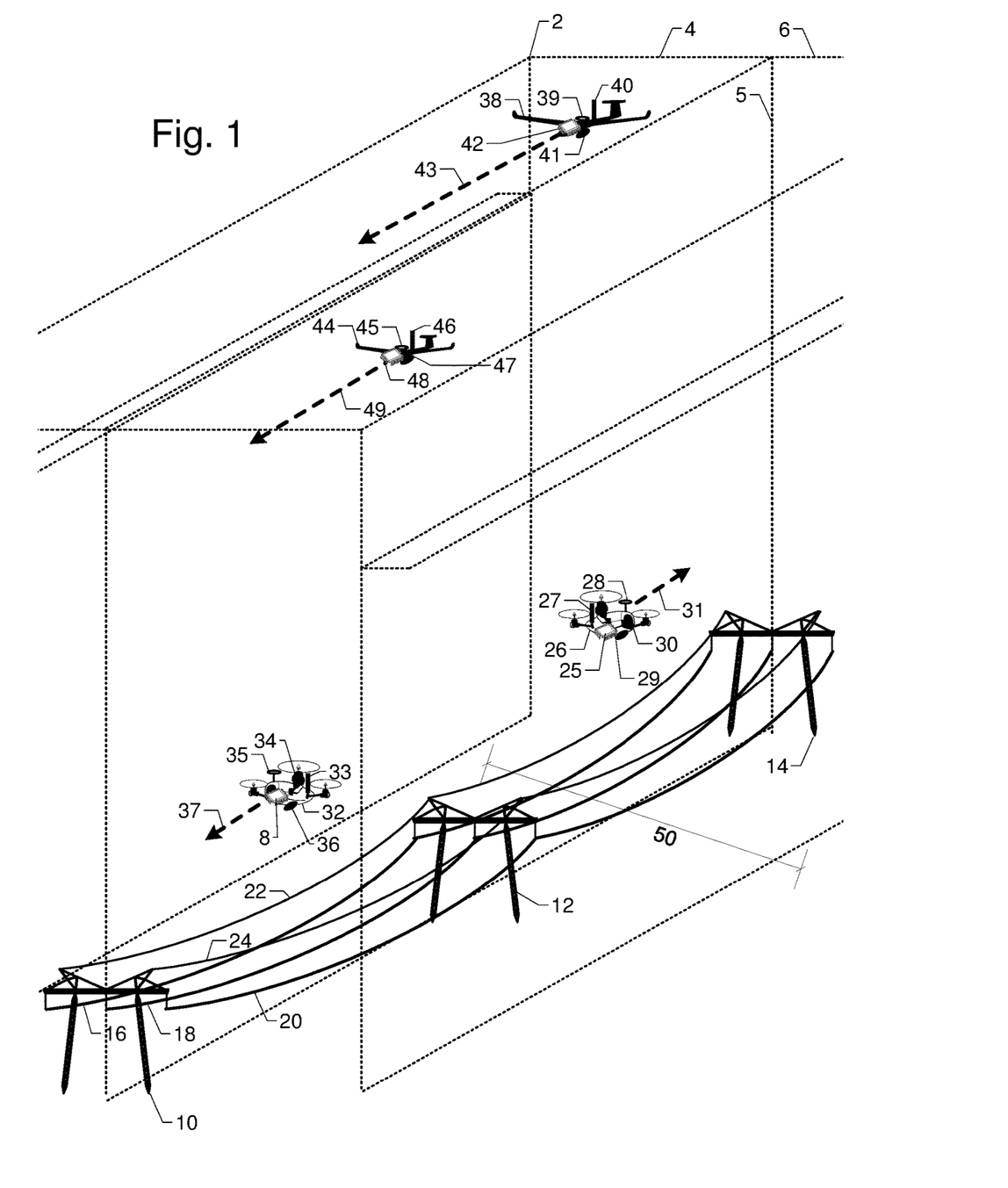
FIG. 1. Perspective view of UAV routing along overhead lines.

FIG. 1 is a perspective view of UAVs routed along a power line. Towers 10, 12, and 14 support phase conductors 16, 18, and 20, as well as shield wires 22 and 24. The utility owning the power line has an easement or right of way 50 that it must keep clear of encroachments. Virtual tunnel 2 contains a left virtual channel 4 and a right virtual channel 6 divided by a surface 5. Multirotor UAV 26 supports autopilot 25 containing a processor and memory; wireless communication device 27; location sensor 28; payload 29; and camera 30 in flight along flight path 31. On the other side of surface 5, multirotor UAV 32 supports autopilot 8 containing a processor and memory; a wireless communication device 33; camera 34, location sensor 35; and payload 36 in flight along flight path 37. Fixed wing UAV 44 supports autopilot 48 containing a processor and memory; location sensor 45; wireless communication device 46; and payload 47 in flight along flight path 48. Large scale fixed wing UAV 38 supports autopilot 42 containing a processor and memory; location sensor 39; wireless communication device 40; and payload 41 flying at much higher speed along flight path 43.

FIG. 1 illustrates flight of UAVs above and beside shield wires 22 and 24, segmented by direction. In this representation UAVs 26, 32, 38, and 44 fly on the right of surface 5 when facing the direction of travel (of course in the United Kingdom and other former Commonwealth countries they may fly on the left!).

Figure 2:
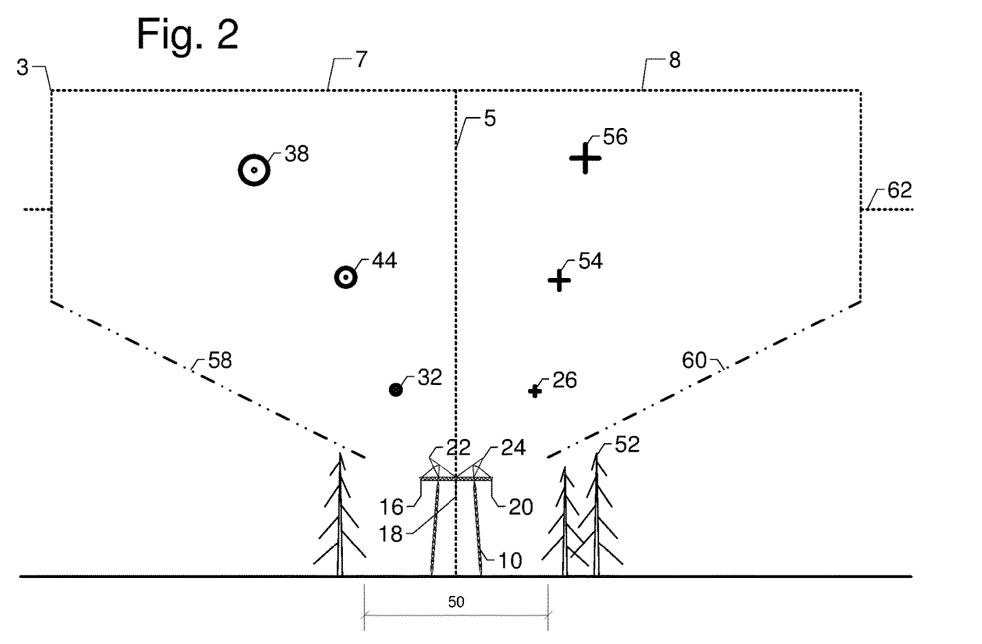
FIG. 2. Section view across right of way showing legal airspace and glide ratio lines FIG. 3. Section view across right of way showing additional virtual routing channels in different orientations and shapes.

FIG. 2 is a much broader section at tower 10 across phase conductors 16, 18, and 20 and shield wires 22 and 24. An easement or right of way 50 is clear of trees, houses, poles, and other obstructions due to vegetation management and incursion detection by the utility company. Trees 52 may grow adjacent to right of way 50, but the utility typically manages nearby trees as well so none can fall across phase conductors 16, 28, and 20. In urban areas taller buildings may obstruct flight adjacent to the right-of-way, so the UAVs will have to fly above them.

In FIG. 2 UAVs 32, 44, and 38 are represented as bullseyes or the tips of an arrow to show their flight paths are coming out of the page with a diameter proportional to flight speed. UAVs 26, 54, and 56 are represented with crosses or the feathers in an arrow to show their flight paths are into the page with a speed proportional to the size of the cross. Double dot dash lines 58 and 60 represent a 2:1 glide ratio from the top of tower 10 at the edge of right of way 50. Dotted line 62 represents the 400 foot top of the legal airspace with current FAA sUAS regulations. The legal limit increases by the height of tower 10 within 400 feet of the tower 10. Thus virtual tunnel 3 and virtual channels 7 and 8 divided by surface 5 are higher than 400 feet and much wider than right of way 50.

The utility company has the right and the obligation to manage incursions into right of way 50 to maintain clearances to phase conductors 16, 18, and 20. Right of way 50 and the airspace above it will be free of obstructions to flight, other than known towers like 10. Human activity is typically limited to crossings at right angles, though occasionally there are trails along rights of way. Structures are not allowed in right of way 50. In the event of a serious problem, such as a power loss with a UAV, it is unlikely to strike a person, vehicle, or structure if it lands in right-of-way 50.

Fixed wing UAVs, such as 38 and 44 may have a glide ratio of more than ten units horizontal for one unit vertical. Helicopter UAVs with autorotation may have a glide ratio of between two and four. Multirotor UAVs typically do not glide. To make sure UAVs land in right of way 50 in the event of problems, the airspace might be segmented by airframe glide ratio. Multirotors 26 and 32 are only permitted to fly directly over right of way 50. Helicopter and fixed wing UAVs such as 44 and 38 can fly further to the sides, but still above their minimum glide ratio represented by lines 58 and 60. This approach segments the available airspace laterally, first left/right by direction of flight and then by lateral distance based on UAV glide ratio.

It may be desirable to also separate UAVs by their cruise speeds or size. FIG. 2 shows the bigger, faster UAVs 38, 56, 54, and 44 flying higher than the smaller multicopters 26 and 32.

The FAA sUAS rule generally limits flight altitude to 400 feet in class G airspace. Near a structure, such as tower 10, UAV flight is allowed 400 feet from the structure. Hence the legal altitude limit 62 rises by the height of tower 10, 400 feet to the left and right of tower 10. This gives UAVs more airspace and a higher safety margin when flying along power lines.

It is dangerous to fly low and slow. Helicopter manufacturers for manned flight publish charts of altitude versus airspeed and recommend either flying high or flying fast. The bottom corner of the chart at low altitude and slow flight is known as "dead man's corner". In routing UAVs along power lines, the extra airspace allowed by the FAA not only eases congestion, but it also provides a bit more altitude for airframe recovery in the event of problems. A drop from 400 feet would take about five seconds to hit the ground. From 500 feet it would take 12% longer which may be enough extra time to manage a recovery.

Near road, rail, and river crossings power line towers are often built higher to provide more clearance and/or longer spans. This is another unexpected benefit for UAV routing along power lines. Exactly where a larger safety margin will be required for safe flight, the towers are taller, and the legal airspace provides more altitude for flight.

Figure 3:
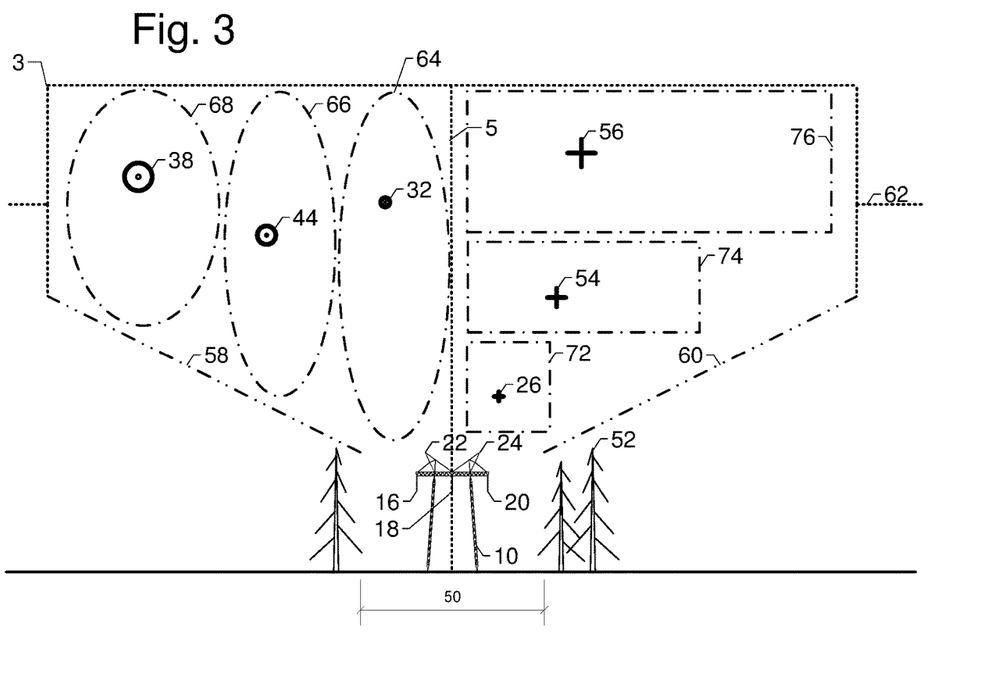

FIG. 3 is a section at tower 10 across phase conductors 16, 18, 20 and shield wires 22 and 24. In utility right of way 50 and the airspace above it there are no obstructions to flight. The FAA legal altitude 62 rises by the height of tower 10 within 400 feet of tower 10. Lines 58 and 60 represent glide ratios of 2:1 so that many airframes can manage to still land in right of way 50 in the event of problems. On the left, slow UAV 32, medium speed UAV 44, and fast UAV 38 are further separated into smaller virtual channels represented by vertical ellipses 64, 66, and 68 respectively. On the right, slow UAV 26, medium speed UAV 54, and fast UAV 56 are separated into horizontal rectangular virtual channels 72, 74, and 76 respectively.

UAVs can select or be assigned different virtual channels based on airframe capabilities with minimum glide ratios and minimum and maximum speeds in each channel. The channels may be arranged vertically, horizontally, or on a diagonal. Likewise the virtual channels may have different shapes such as the ellipses and rectangles illustrated here.

Figure 4:
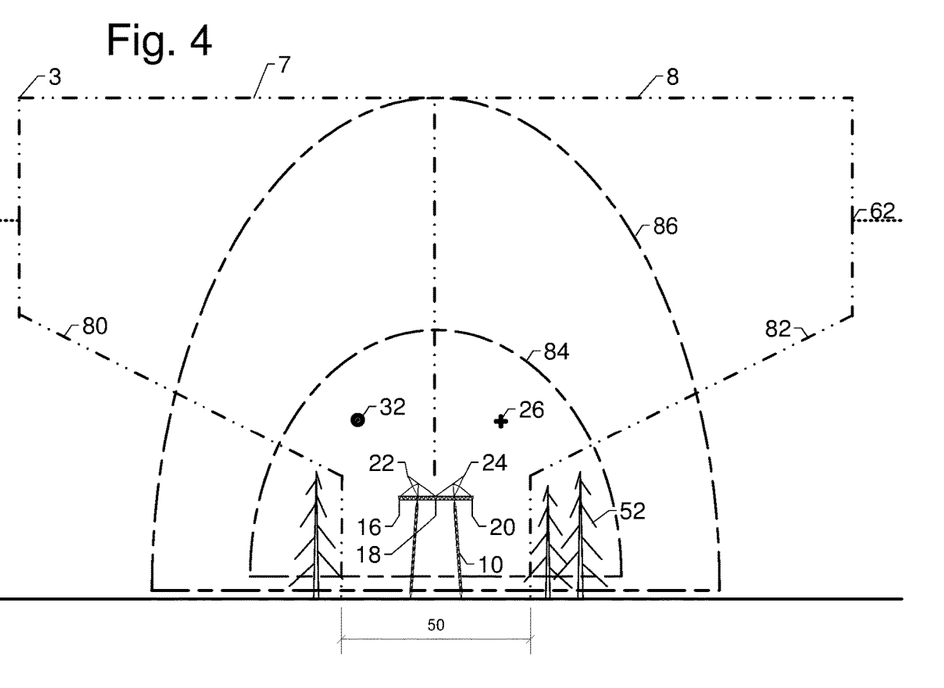
FIG. 4. Section view across right of way showing software and hardware geofence boundaries.

FIG. 4 is a section at tower 10 across phase conductors 16, 18, 20 and shield wires 22 and 24. Utility right of way 50 and tower 10 height at shield wires 22 and 24 defines the base of clear airspace. Dash double dotted lines define a software geofence on the left 80 and right 82 aligned with virtual channels 7 and 8 in virtual tunnel 3. Dash, long dash lines 84 and 86 represent approximate lines of equal 50/60 Hz electric field strength. An electric field strength meter could implement a hardware geofence to contain UAVs 26 and 32.

A geofence is a virtual boundary beyond which a UAV should not be able to fly. Most current autopilots implement geofences as vertical cylinders of a given height and radius around the takeoff location. If the autopilot is given incorrect waypoints, if it malfunctions, or if the wind is too strong, then UAV 26 may breach the geofence. Then the failsafe code should return he UAV to the launch point or immediately land UAV 26.

A software geofence shape more appropriate for routing along power lines is an elongated prism parallel to the ground for the left 80 and right 82 parts of the clear airspace.

An unexpected benefit of flying near power lines is that the geofence can also be implemented in hardware. Antennas or sheets of a metal foil placed on three orthogonal sides of a cube mounted on UAV 26 will measure electric field strength, no matter the orientation of UAV 26. A minimum field strength is set before the flight or early in the flight. Then the field strength measured during flight is compared to the preset minimum. If the current field strength ever falls below the preset minimum, UAV 26 can be forced to drop, land, deploy a parachute, or otherwise be stopped. This prevents flyaways, problems from GPS spoofing, loss of radio control, or bad guidance from someone impersonating the remote control as described in "UAV Constraint in Overhead Line Inspection", U.S. Ser. No. 14/733,962 van Cruyningen and Van Wart, incorporated in full by reference.

The electric field sensor can also be used as a location sensor for navigation. If the three orthogonal foil sheets are attached to separate analog to digital converters, then the strength and direction of the electric field in each direction can be detected in real time. The field along straight phase conductors is always zero due to symmetry. The field decreases roughly as the inverse radius away from the phase conductors. Thus if UAV 26 is flying with zero measured electric field in the fore-aft direction then it is flying parallel to the lines. The strength in the other two directions gives an indication how far UAV 26 is from phase conductors 16, 18, and 20 if the voltage of the power line and geometry are known.

Power lines tend to have a consistent configuration from tower to tower along the lines (except at transposition towers). This may be three across as shown in FIG. 1; or three vertical; or three pairs of conductors vertically, etc. The clearances between phase conductors 16, 18, and 20 are also kept constant because they are typically set to the minimum that meets leakage and noise goals. With a known conductor configuration and separation, a single camera can be used as a location sensor to detect the angle and distance to the lines in real time as described in "Aerial Photogrammetry of Overhead Lines" U.S. 61/940,371, incorporated in full by reference.

The above paragraphs described location sensors based on GPS, the electric field sensor, and vision with triangulation. Other examples of location sensors include stereo cameras, LiDAR sensors, and radio beacon triangulation. Using more than one location sensor provides redundancy for much greater reliability in flight.

Figure 5:
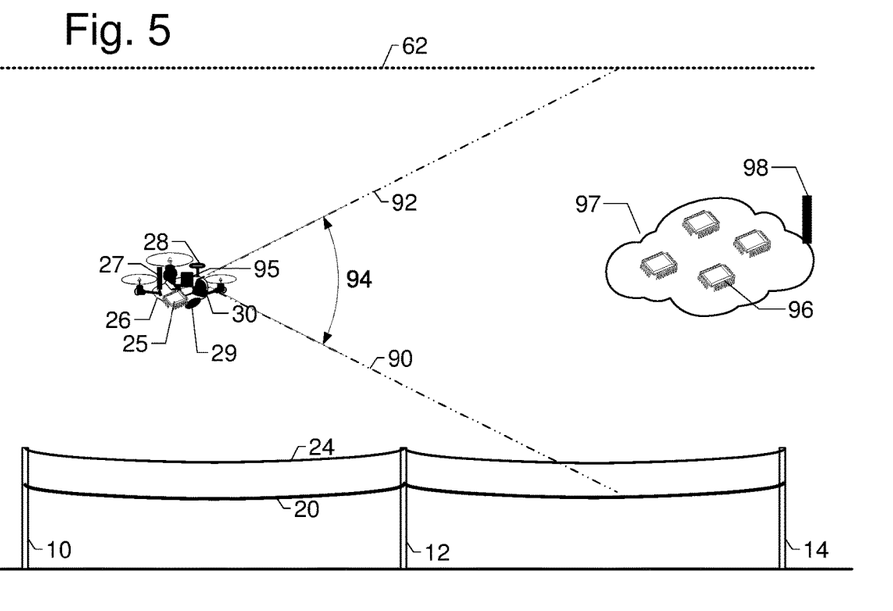
FIG. 5. Section view along the right of way showing collision avoidance angle of view.

FIG. 5 is a section along phase conductor 20 and shield wire 24 showing towers 10, 12, and 14. UAV 26 is flying below the FAA legal limit altitude 62, using obstacle detection sensor 95 to scan in the forward direction in an angle 94 delimited by lines 90 and 92. Server processors and memory 96 located in the Internet cloud 97 and communicating with wireless communication device 98 with the wireless communication device 27, 33, 40, and 46 on the UAVs could also be used to direct UAV traffic.

Sensing and avoiding other UAVs and obstacles is a challenging problem for completely free 3D flight. LiDAR, SONAR, RADAR, stereo cameras, and other obstacle detection sensors are limited by how many samples they can measure from a multitude of different angles. To scan the entire four Pi steradians around a UAV takes time and power. By constraining the UAVs to linear flight along power lines and defining some "rules of the route" the problem can be greatly simplified. With two basic rules "fly on the right" as shown in FIG. 1, and "overtaking UAV has to keep clear", a UAV primarily has to scan in a forward cone as shown by angle 94 between lines 90 and 92. In this example the fifty four degree cone subtends about 5% of the four Pi solid angle of the whole hemisphere, thus simplifying the detection problem by about a factor of 20.

If all the UAVs cooperate and broadcast their positions over wireless communication devices 27, 33, 40, and 46 using ADS-B or the equivalent, then obstacle detection sensor 95 is no longer as critical in detecting UAVs. However it is still useful for other obstacles or non-cooperating or broken UAVs.

An alternative to obstacle detection on each UAV is to use a system similar to air traffic control. Server processors and memory 96 located in the Internet cloud 97 would track each UAV 26, 32, 38, 44 and select flight paths for them based on the other traffic in the vicinity.

Figure 6:
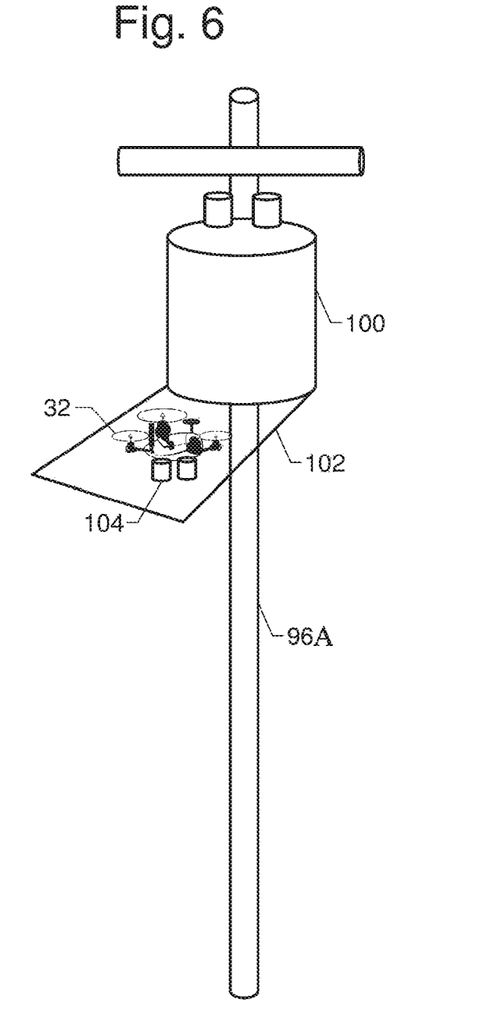
FIG. 6. Perspective view of charging and transfer platform.

FIG. 6 is a perspective view of a transfer and recharge platform. Distribution pole 96A supports transformer 100 with landing platform 102 supporting recharging contacts 104 for UAV 32. These platforms provide convenient voltages up in the air to allow UAV 32 to recharge to extend its range. UAV 32 cannot be stolen, people cannot be electrocuted, and the location high on a pole makes it much less likely the charging station will be tampered with or vandalized. A transfer and recharge platform up on a pole could also be used to transfer payloads between long-distance UAVs and local delivery UAVs.

Figure 7:
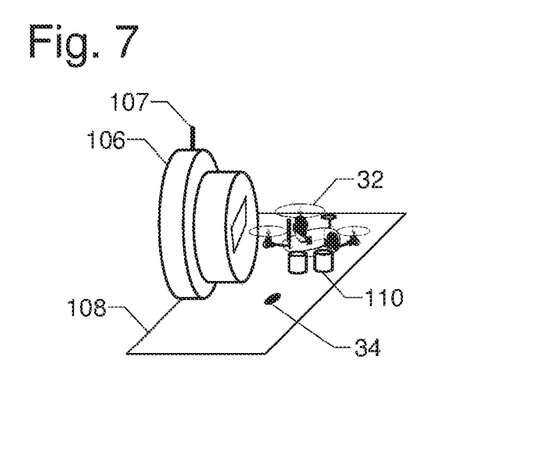
FIG. 7. Perspective view of landing platform.

FIG. 7 is a perspective view of a delivery platform with power meter 106, wireless communication device 107, landing platform 108 supporting payload 34 and recharging electrodes 110 for UAV 32. A power meter is a reasonable place to land and drop off cargo as well as get a recharge. Enhancements would be a locking box to deposit the cargo and notifications to the occupants that the cargo had arrived. Smart meters already contain wireless communication devices.

Figure 8:
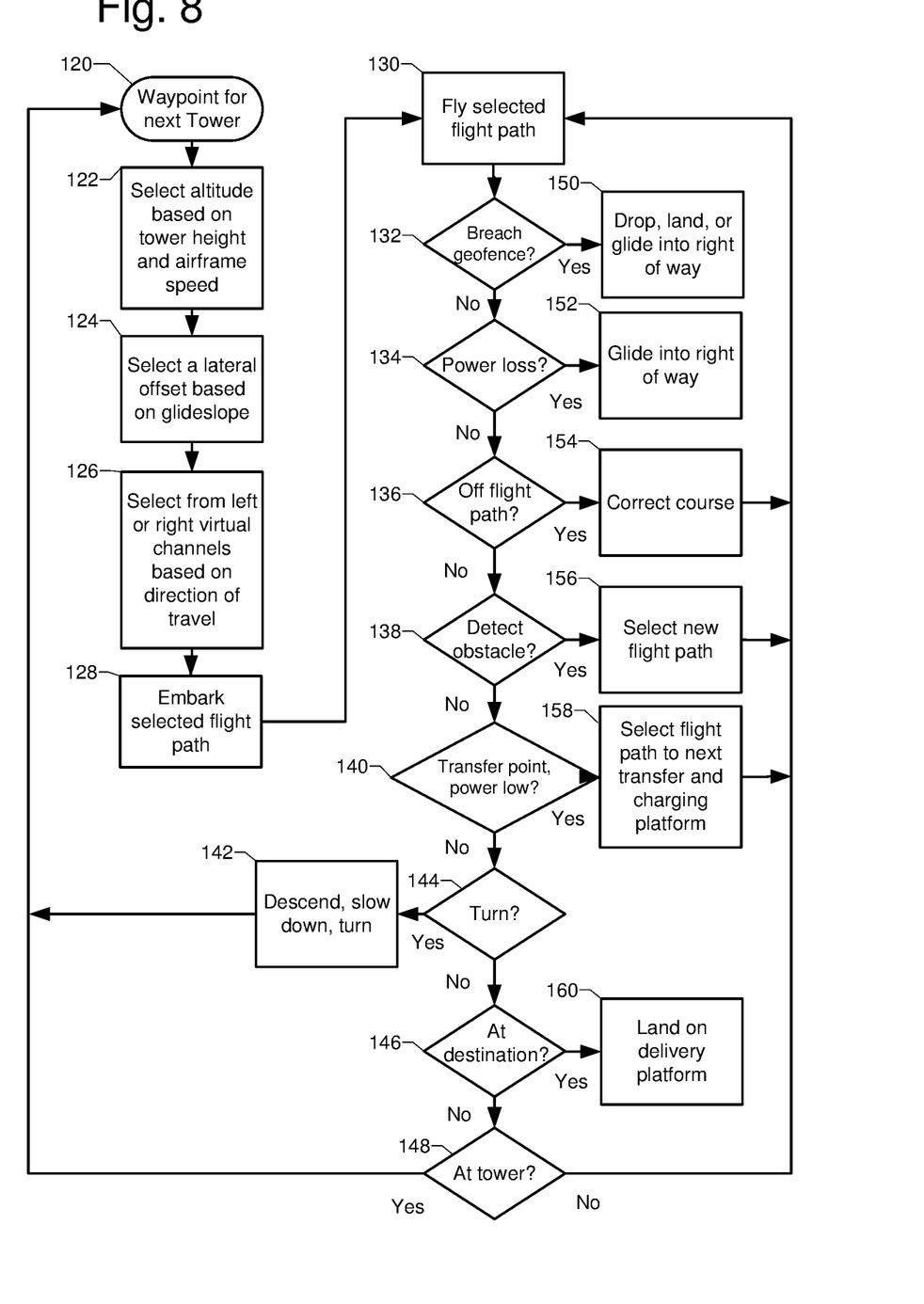
FIG. 8. Flowchart for UAV routing between towers.

FIG. 8 is a flowchart for UAV navigation between towers 10, 12, and 14. Tower waypoints are stored in memory of autopilot 25 before the flight or received during flight through wireless communication device 27. When the UAV is at a given tower it looks up the waypoint for the next tower 120. It selects an altitude based on the tower height and its relative airframe speed 122. It selects a lateral offset based on its glideslope 124. If there are additional virtual channels defined like 64, 66, 68, 72, 74, or 76, then it will select a virtual channel that provides for its speed and glide ratio. Then it selects to fly to the left or right 126 based on direction of travel and embarks on the chosen flight path 128.

Alternatively, a UAV traffic control system using server processors and memory 96 located in the Internet cloud 97 and communicating wirelessly 98 with individual UAVs 26, 32, 38, 44, could select flight paths for them to ensure there are no collisions.

Autopilot 25 flies the selected flight path 130, repeatedly checking for a number of conditions:

if a geofence was breached 132, then it drops, lands, or glides into the right of way 150;

if it detects loss of power 134, then it glides into the right of way 152;

if the comparing detects a deviation from the planned flight path 136 using output of location sensor 28, then it corrects the course 154 and keeps flying the selected flight path 130;

if it detects an obstacle 138, then it selects a new flight path beside or above the obstacle 156 and flies the newly selected flight path 130;

if it is near the waypoint of its transfer point or low on power 140, it selects a flight path to the nearest transfer and charging platform 158;

if it has to turn at an intersection of power lines 144, then it descends, slows down, and turns 142 before finding the waypoint for the next tower 120;

if it is at its destination 146, then it lands on the delivery platform 160;

otherwise if it is at the tower 148, then it starts with the waypoint for the next tower 120, or else keeps flying the selected flight path.

This section illustrated details of specific embodiments, but persons skilled in the art can readily make modifications and changes that are still within the scope. For example the discussion has focused on electric power lines, but all the same concepts apply to electrified railway rights of way.

I claim:

1. A method for regulating flight paths of unmanned aerial vehicles (UAVs) each with an autopilot, the method comprising the steps of:

defining a virtual tunnel above and along waypoints defined by the supports for a power line, the virtual tunnel including a first and second virtual channels along the power line;

wherein a first plurality of flight paths each defined by an altitude and lateral offset from said waypoints within the first virtual channel are along a first direction generally along the power line;

a second plurality of flight paths each defined by an altitude and lateral offset from said waypoints within the second virtual channel are along a second direction generally along the power line; and the first direction is opposite to the second direction;

embarking by a first UAV on a first selected flight path of the first plurality of flight paths along the first direction, the first UAV moving along the first selected flight path;

detecting by a first location sensor of the first UAV a location of the first UAV; and comparing with said autopilot of the first UAV the location of the first UAV with the first selected flight path.

2. The method of claim 1 further comprising embarking by a second UAV on a second selected flight path of the second plurality of flight paths along the second direction, the second UAV moving along the second selected flight path.

3. The method of claim 1, wherein the virtual tunnel width and altitude above ground are defined by regulation.

4. The method of claim 1, wherein the virtual tunnel has a first and second glide ratio surfaces as a lower boundary outside the power line right of way.

5. The method of claim 4, wherein angles of the first and second glide ratio surfaces are equal to or steeper than the glide ratio of the first UAV.

6. The method of claim 1 further defining a plurality of additional virtual channels in each direction based on UAV glide ratio capability.

7. The method of claim 1 further defining a plurality of additional virtual channels in each direction based on UAV speed.

8. The method of claim 1, wherein the first location sensor is a global positioning system sensor.

9. The method of claim 8, wherein the autopilot on the first UAV implements a software geofence matching the boundaries of the virtual channels.

10. The method of claim 1, wherein the first location sensor detects electric field strength and said comparison of the location of the first UAV with the first selected flight path includes comparison of electric field strength.

11. The method of claim 10, wherein the first UAV compares the electric field strength with a predefined minimum value and stops the flight if a measured value of the electric field strength is below the predefined minimum value thereby enforcing a hardware geofence.

12. The method of claim 1, wherein the first location sensor is a camera that detects its location relative to the power line using triangulation of known separation of phase conductors or shield wires in the power line.

13. The method of claim 1 further comprising rerouting by a processor in the autopilot of the first UAV, the first UAV returning to the first selected flight path upon a determination that the location of the first UAV is off course based on said comparison of the location of the first UAV with the first selected flight path.

14. The method of claim 1 further comprising detection of obstacles or other UAVs.

15. The method of claim 14, further comprising selection of a different flight path when an obstacle is detected.

16. The method of claim 1, wherein the first plurality of flight paths and the second plurality of flight paths are stored in a server with processor and memory.

17. The method of claim 16, wherein the first UAV receives the first selected flight path from the server through wireless communications.

18. The method of claim 16, wherein the server assigns the first selected flight path based on glide slope, speed, and size of the first UAV.

19. The method of claim 1 further comprising rerouting by a processor in the autopilot of the first UAV, the first UAV moving to a transfer and recharge platform on a tower or a pole supporting the power line;

wherein the transfer and recharge platform includes recharging electrodes for the first UAV.

20. The method of claim 1 further comprising rerouting by a processor in the autopilot of the first UAV, the first UAV moving to a transfer and recharge platform of a tower or a pole supporting the power line; wherein the first UAV drops off a payload on the transfer and recharge platform.

21. The method of claim 1 further comprising changing by a processor of the first UAV a speed of the first UAV at an intersection of the power line and an other power line; wherein the first UAV receives traffic conditions of other UAVs along the other power line from a server.

22. The method of claim 1 further comprising changing by a processor of the first UAV an elevation of the first UAV at an intersection of the power line and an other power line; wherein the first UAV receives traffic conditions of other UAVs along the other power line from a server.

* * * * *